United States Patent [19]

Knox

[11] Patent Number: 6,134,863
[45] Date of Patent: Oct. 24, 2000

[54] PROCESS FOR PACKAGING METAL PIGMENT POWDER

[75] Inventor: Jonathan Joseph Wissler Knox, Fife, United Kingdom

[73] Assignee: Silberline Limited, United Kingdom

[21] Appl. No.: 09/190,836

[22] Filed: Nov. 12, 1998

[30] Foreign Application Priority Data

Nov. 11, 1997 [GB] United Kingdom .................... 9723723

[51] Int. Cl.$^7$ ..................................................... B65B 31/00
[52] U.S. Cl. ................................ 53/432; 53/431; 53/434; 53/440
[58] Field of Search ............................. 383/45, 102, 103; 206/1.9, 484.1; 53/127, 431, 432, 433, 434, 440, 510, 511, 512

[56] References Cited

U.S. PATENT DOCUMENTS

| | | |
|---|---|---|
| 1,569,484 | 1/1926 | Hall . |
| 2,046,146 | 7/1936 | Brady . |
| 2,084,296 | 6/1937 | Eustis . |
| 2,284,551 | 5/1942 | Alexander . |
| 2,340,546 | 2/1944 | Meaker . |
| 2,593,328 | 4/1952 | Meaker . |
| 2,858,230 | 10/1958 | Knoll et al. . |
| 3,565,655 | 2/1971 | Higaki . |
| 3,901,688 | 8/1975 | Casey et al. . |
| 4,115,107 | 9/1978 | Booz et al. . |
| 4,544,600 | 10/1985 | Kern . |
| 4,672,684 | 6/1987 | Barnes et al. . |
| 4,693,754 | 9/1987 | Kondis . |
| 4,705,560 | 11/1987 | Kemp, Jr. et al. . |
| 4,718,577 | 1/1988 | Morris et al. . |
| 4,743,123 | 5/1988 | Legters et al. . |
| 5,037,475 | 8/1991 | Chida et al. . |
| 5,221,340 | 6/1993 | Nagase et al. . |
| 5,348,579 | 9/1994 | Jenkins et al. . |

FOREIGN PATENT DOCUMENTS

| | | |
|---|---|---|
| 2163529 | 8/1994 | Canada . |
| 0104075 | 3/1984 | European Pat. Off. . |
| 0134676 | 7/1984 | European Pat. Off. . |
| 2662702 | 12/1991 | France . |
| 1124619 | 11/1959 | Germany . |
| 9-111315 | 4/1997 | Japan . |
| 435 474 | 9/1961 | Switzerland . |
| 653 644 | 7/1948 | United Kingdom . |
| 952 855 | 6/1960 | United Kingdom . |
| 1 152 078 | 5/1969 | United Kingdom . |
| 1191204 | 5/1970 | United Kingdom . |
| 1191205 | 5/1970 | United Kingdom . |
| 94/02551 | 3/1994 | WIPO . |
| 94/28074 | 8/1994 | WIPO . |

OTHER PUBLICATIONS

Derwent English language abstract of Japanese Appli. No. 58/168663 for Metal Powder Pigment Composition Prepared by Treating Metal Powder with Organic Phosphate.

*Primary Examiner*—Daniel B. Moon
*Attorney, Agent, or Firm*—Ratner & Prestia

[57] ABSTRACT

There is provided a process of packaging metal pigment in a substantially non-dusting manner. The process includes the step of dampening the metal pigment with a liquid which may be water or an organic solvent compatible with that pigment type. The dampened pigment is then placed into a porous container which is sealed prior to removal of the liquid. The porosity of the container is chosen to permit removal of the liquid (for example by evaporation and/or centrifugation) whilst retaining substantially all of the pigment. Suitable containers include paper bags (such as autoclave bags), woven fiber materials (optionally calendered or coated) and polymer materials. The substantially dry metal pigment can be conveniently stored or transported within the container and is in a convenient form to use in a powder coating process.

19 Claims, No Drawings

PROCESS FOR PACKAGING METAL PIGMENT POWDER

The invention provides a process for delivering dry metal powder in a safe, dust free form.

Metal pigments, principally aluminium and "gold bronze" (an alloy of copper and zinc), are widely used in surface coatings and for the mass pigmentation of plastics. Due to their very small particle diameter, typically 5–50 μm, such pigments are liable to form dust clouds. This is especially true of aluminium metal with its low density. Derived dry aluminium pigments are also extremely explosive, even in very low concentrations. For these reasons, production of dry metal pigments has been superseded by pastes and granular forms in which the metal particles are immobilised by solvent or resinous carriers respectively.

The present invention relates to a process for delivering substantially dry metal pigment in a safe, dust free form. Metal pigments are commonly manufactured in the form of flakes, but may also be polished spheres as described, for example, in European Patent Publication 0651777.

Metal flake pigment may be prepared from atomised metal powder by either wet or dry ball milling. In dry ball milling (see for example U.S. Pat. No. 4,115,107) metal powder is ball milled without solvent, but normally in the presence of a lubricant to prevent cold welding. The cascading action of the grinding balls flattens the starting powder into flakes. The process is normally made safer by operating in the presence of inert gas, which is passed through the mill at such a rate that flake pigment is removed as it is formed.

In wet ball milling (see for example U.S. Pat. No. 1,569,484 and U.S. Pat. No. 3,901,688) metal powder is ball milled with an organic liquid such as mineral spirits and a small amount of lubricant such as oleic acid or stearic acid. The resulting flakes are separated, for example by wet sieving, to provide the desired particle size distribution and brought to a paste-like consistency of typically 55–80% by weight.

Sections 2.2 to 2.4 inclusive of "Aluminium and Bronze Flake Powders" by G W Wendon (Electrochemical Publications Ltd, 1983) describe both the dry Hametag process and the wet milling Hall process.

The granular form of metal flake pigment, in which dry or wet milled flakes are combined with resinous or wax carriers at typically 70–80% metal pigment and 20–30% carrier, is described in European Patent 0134676.

The metal powder starting material may be prepared in an atomiser (see for example U.S. Pat. No. 4,705,560). Conventional powder produced in this way consists essentially of fairly uniform particles having a median particle size ($D_{50}$) of 1 to 300 μm, usually 3 to 75 μm and an aspect ratio, that is the ratio of the largest dimension to the smallest, of about 1.5 to 5:1. Polished atomised metal pigment powders of increased reflectivity, suitable for the process described in European Patent 0651777, have a tighter aspect ratio, preferably 2:1 to 1.1:1, especially 1.25:1 to 1.1:1.

The physical form of the metal flake pigment has a considerable influence on its properties in application. Metal flake pigment pastes have a typical composition of 60–85% metal flake and 15–40% solvent. The solvent is often white spirit and/or comparable molecular weight aromatic hydrocarbon fractions. Such pastes are widely used in automotive and industrial paints. In contrast, the presence of such solvents in printing inks causes residual odour in the printed film. Moreover, the ink is slow to dry, thereby limiting press speeds.

These disadvantages have been overcome by the granular process of European Patent 0134676. The high concentration of metal flake in viscous or solid carrier provided therein eliminates the dust hazard associated with dry metal flake pigments. Being substantially free of high boiling hydrocarbon solvents, such granules can be easily dispersed in low flash point ink solvents or in fully constituted ink media. The carrier material is generally chosen for compatibility with the intended end use.

In plastics too, the granular form offers advantages over both dry flakes and metal flake pigment pastes. Significant quantities of solvent are unacceptable during the processing of thermoplastics. Volatilisation of the solvent by the heat supplied to melt the thermoplastic causes both odour and bubbles of gas in the processed part.

Dry metal flake pigments have the advantage of wide compatibility. There is no need to consider whether the chosen solvent, in the case of a paste, or carrier, in the case of a granule, is compatible with the components of the application system. Dry metal flake pigments are also cheaper to prepare, because of the simple, single stage process. No expensive solvents or carriers are needed. Neither is there an increased transport cost arising from their use to dilute the metal pigment.

When metal pigment pastes are dried, a certain amount of particle-particle aggregation may take place. This leads to poor wetting in the application medium. A significant problem in the use of dry metal flake pigments in plastics is the difficulty of wetting each flake into the polymer matrix. This can be overcome by prewetting the flakes with a small amount, typically 5%, of a plasticiser such as a phthalate ester or a mineral oil. In printing inks, part of the solvent content of the ink may be used to provide wetting.

Thus the main obstacle to the widespread use of dry metal flake pigments is their wetting, dusting and explosive characteristics. Apart from being contaminating to the workplace, metal pigment dust is generally classed as nuisance dust from a health standpoint. Although the maximum permitted respirable concentration varies from country to country, typical levels are from 4 to 10 mg per cubic meter of air. There is therefore a need to find means to contain such dusts. Containment must apply during processing to prepare and package the pigment, transporting to the user and processing in the user's premises.

Attempting to package dry metal pigment is contaminating, hazardous and costly. If filled into drums from a silo, stringent precautions must be taken to ensure that all equipment is earthed to avoid build up of static charge. The flake form of aluminium pigment is particularly likely to be lifted into the air by the lightest of currents. As little as 10 g per cubic meter in the atmosphere is capable of sustaining an explosion. Local ventilation, in the form of extractors and ducting, is undesirable as a means to maintain the concentration below the explosive limit. Dust can build up in ducting, with a corresponding increase in explosion hazard. It is an objective of the present invention to eliminate such dust hazard.

The present invention provides a process for packaging metal pigment, said process comprising:

a. providing metal pigment dampened by a liquid;

b. placing said dampened metal pigment in a porous container and sealing said container; and c. substantially drying said pigment within said sealed container wherein the porosity of said container is chosen to permit removal of the liquid whilst retaining substantially all of said pigment within the container.

Thus, the container is sufficiently porous to permit escape of the liquid, but is insufficiently porous to allow escape of said pigment.

As explained above, the porosity of the container is chosen to retain substantially all of the pigment placed therein. Whilst the escape of a trace of the pigment from the sealed container may be acceptable, advantageously, no pigment is permitted to escape from the container.

Generally, the container must be sealed in a manner that maintains the requirement for containing the pigment.

Metal pigments are generally prepared in a liquid, rather than dry milled, for the reasons recited above. The dampened product is placed into the porous container. The dampened pigment avoids problems of dusting during loading of the container, with the concomitant problems associated therewith. Optionally, the dampened pigment is in the form of a paste which is convenient to handle. However, the invention is not limited to any particular consistency of paste.

The invention also provides a package containing substantially dry metal pigment wherein said metal pigment is secured inside a porous container. The container is sufficiently porous to permit any liquid (such as a solvent) initially associated with the pigment to be removed whilst retaining the metal pigment. Contained in this way the pigment is dust free.

Desirably the majority of the liquid used to dampen the metal pigment is removed since this will reduce the overall weight and bulk of the sealed container for storage or transportion purposes. Additionally, there are some processes requiring a dry metal pigment for which the packaged pigment would be especially suited. However, it may not be necessary to remove all of the liquid and usually at least a trace of the liquid will be present with the pigment. Generally, however, the pigment will be substantially dry, that is will have the flow characteristics and handling of a powder.

The packaged pigment can be safely transported, if required, without the associated hazards of dusting. Thus, the present invention provides a process of transporting substantially dry metal pigment, said process comprising packaging said pigment as described above and transporting said packaged pigment.

Further, the present invention provides a delivery system for substantially dry dusting metal pigment, wherein said delivery system is a porous container as described above adapted to permit controlled particle egress in a manner which limits escape of dusting particles. For example, the container may have a particle exit means, adapted to co-operate with a container or other body intended for receipt of the metal pigment. Optionally, the particle exit means is resealable.

There is no criticality to the particle size or shape of the metal pigment used in the process, package or delivery system of the invention provided the container is chosen to have a porosity such that the pigment particles do not escape. Fine particle size flake pigments, that is those having a median particle size of from 5–20 $\mu$m, are particularly favoured due to the difficulty in processing them in dry form by conventional methods. Pigments of median particle size (e.g. of approximately 20–50 $\mu$m, especially 30–40 $\mu$m for example 36 $\mu$m) are also of interest and can advantageously be processed according to the present invention. Mention may, however, also be made of ESS pigments (polished spheres) and glitter flakes.

Although any container may be used which meets the criteria for porosity recited above. Particularly suitable containers may include a flexible bag portion made of paper, woven fibre material optionally calendared or coated (for example the woven materials used in the automobile industry for airbags) or polymers (for example a plastics material). Especially suitable are paper bags of tightly controlled porosity used for sterilisation of hospital instruments, known as autoclave bags.

Preferably, the porous container may have an anti-electrostatic discharge coating; this aids loading of the container and removal of the powder as well as reducing the risk of sparking due to static inside the container.

The liquid may be any organic solvent for the pigment in question, or water. Suitable organic solvents for metal pigment handling are well known in the art, but mention may be made of white spirit, alcohols, esters, aromatic hydrocarbons, aliphatic hydrocarbons, cycloaliphatic hydrocarbons and (optionally substituted) mineral oils.

It is possible for the liquid to include small quantities of a solid or a non-volatile liquid additive in order to further reduce the dusting of the metal pigment and/or to aid redispersion of the metal pigment. The additive should be soluble or dispersible in the liquid and should be added prior to insertion of the dampened metal pigment in the porous container. Suitable additives include, for example, a solid resin or liquid plasticiser. Generally the additive will be present in an amount of 10% or less (by weight relative to the liquid). Too much additive would cause the metal pigment particles to stick together in a large intractable mass (having dimensions of several millimeters). Added in an appropriate quantity the additive would further reduce the dusting tendency and/or aid dispersibility of the metal pigment.

The liquid may be removed by any convenient means. Generally liquid removal occurs by evaporation of the liquid. Air circulating or vacuum ovens are appropriate. If the container chosen has sufficient structural integrity, a centrifuge may be used to remove some of the liquid prior to completion of drying in an oven.

The ambient temperature, the size and shape of the container and the volume of paste employed determine the rate at which liquid is removed. As the temperature is increased, liquid removal will be accelerated. Temperatures of up to about 200° C. are suitable for paper bags. Generally, if higher temperatures are used, drying time is decreased, but there may be an increase in explosion hazard so that drying at higher temperatures may need to be conducted in a nitrogen atmosphere. For practical purposes, a temperature of 50–100° C., for example 60–80° C., at ambient pressure has been found satisfactory. Unless solvent removal is to be conducted in a vacuum oven, it is advantageous to carry out this process step in a reduced oxygen atmosphere to reduce the fire hazard from emerging solvent vapours.

Rectangular pouches have been found to give good results, providing the aperture is the full width of the pouch to permit easy loading of the pigment. It is also advantageous to measure the volatile content of the starting metal pigment paste, then add to the container a quantity which will provide an integral number of unit weight, eg kilograms, of dry product pigment. If too little paste is loaded into the container, there will be an excessive number of containers used, with consequent expense. If too much paste is used, the drying time will be unreasonably extended. Regard must also be had to the wet strength of the container. A ratio of weight of metal pigment paste (in kilograms) to the surface area of the container (in square meters) between 2:1 and 12:1 has been found satisfactory, but depending upon the density of the metal pigment could be as high as 20:1. A ratio of around 6:1 has been found particularly satisfactory for aluminium flake pigments.

The packaging system of the present invention is particularly suitable for delivery of metal pigments in powder form without the associated hazards of handling such powders. The sealed containers holding the metal pigment powder can then be opened under controlled conditions. Advantageously, the sealed container is adapted to permit emptying whilst avoiding escape of any powder.

The invention is particularly suited to providing products for so-called powder coating paints. In the powder coating process, a finely divided resin is electrically charged and allowed to impinge by electrostatic attraction on an earthed metal target. The coated target is then exposed to a source of heat at a temperature sufficient to melt the resin and cause it to flow out, thereby completely coating the article. On cooling, a thick, tough coating is obtained.

Powder coating provides several challenges for metal pigments. The density of the metal is several times that of the resin powder. The charging characteristics are also different. The combination of these factors causes the painted article to show a mottled effect. On a paint panel or other object with sharp edges, there is often exhibited the phenomenon known as "picture framing". This appears as a much more reflective strip, immediately adjacent to the edges of the panel.

The overspray from the coating process, ie that part of the sprayed powder coating which does not attach to the target, has a different composition to that of the starting powder. Recycling such material is essential to the economics of most powder coating facilities. Segregation of the overspray makes it difficult to maintain the original appearance when the material is reused.

This problem can be overcome in two ways, but both are unsatisfactory. The first solution is to attach the powder to the powdered resin in a separate step. This is achieved by the so-called bonding process, described in U.S. Pat. No. 4,138,511. All the resin powder is generally used, although the metal pigment concentration is typically only 2–5% by weight. This makes such a process technically acceptable, but very costly.

The second method is to incorporate the metal pigment into the powder coating resin during its preparation. Powder coating systems can be complex, consisting of resins such as epoxy, polyester or polyurethane, colorants, extenders such as calcium carbonate or blanc fixe, flow control agents and antioxidants. In a typical production process, these ingredients are heated together in an extruder, then micronised to a particle size suitable for spraying. The shear action of the extruder bends and breaks metal flake pigments, reducing their colour and reflectivity. This route therefore tends to be rejected on quality grounds.

There exist in the market metal flake pigments coated by a layer of silica. The very low density of the form of deposited silica reduces the density of the whole flake, bringing it closer to that of the powder coating resin. The electrostatic charging characteristics are also more satisfactory. As the flakes must be particulate to provide the necessary degree of dispersion on the sprayed target, it is not practical to damp the particles with solvent or encapsulate them in resin to form the granular products recited above. It follows that such silica coated flakes remain difficult to handle.

It is an advantage of the process of the invention that such flakes may be recovered from the solvent of their manufacture and delivered in non-dusting form to the end user. The container may be opened directly into the already micronised powder coating resin. A brief and gentle mixing to homogenise the components provides a composition which is ready to spray.

In a further aspect, the present invention provides a process for powder coating an object, said process comprising:

a. providing substantially dry metal pigment powder in a sealed porous container;

b. opening said container and transferring said pigment powder to micronised powder coating resin in a non-dusting manner;

c. mixing said pigment powder and resin; and d. spraying said object with the mixture of step c.

In a yet further aspect, the present invention provides objects having a powder coating as described above.

Certain other applications would benefit from a dry form of metal pigment for technical reasons. Chief amongst these are radiation cured systems, especially UV cured inks and paints. Such coating systems contain a liquid component, which is cured to become part of the final coating through the action of ultra violet light.

Contact of UV active liquid components with metal pigments, especially aluminium pigments, can cause premature curing of the system. The response to this has traditionally been to employ non-reactive diluents, such as liquid long chain alcohols or solid resins as carriers for aluminium flake pigments. Unfortunately, such materials are detrimental to film durability since they do not cure with the UV binders to the required tough polymeric state.

Thus, for radiation cured systems there is a need for a product delivery form which provides stable metal pigments without the use of non-reactive diluents. A dry pigment form can be utilised, especially as wetting into the vehicle is less of a problem for these lower viscosity systems.

The following examples illustrate the preparation of a metal pigment according to the invention.

EXAMPLE 1

An aluminium flake pigment of 15 $\mu$m median particle diameter was coated with silica at 7% by weight on metal.

1.5 kg of the coated flake, in the form of a paste of 50% w/w metal in methoxypropanol was loaded into an autoclave bag type SBM 36 (Lawdon Mardon Ltd) of surface area 0.60 square meters. In the EN868-3 standard test the bag is held to have a porosity of 19 $\mu$m (ie a 19 $\mu$m diameter bubble is seen in the test). The bag was placed in a recirculating oven at 65° C. and the oxygen content maintained below the explosive limit using nitrogen. Drying to constant weight took 11 hours. Allowing for the weight of the bag, 1.5 kg of dry aluminium flake pigment product was recovered. No metal flake had escaped from the bag as determined by weight measurements and by the lack of silver discoloration of the bag.

The recovered pigment was tumble blended into a clear polyester powder coating resin (4900/080 of Ferro Ltd) at 3.5% metal. This mixture was electrostatically sprayed onto an earthed metal panel and cured at 170° C. for 10 minutes.

The resulting painted surface was particularly bright and free from defects, including the "picture framing" effect.

EXAMPLE 2

An aluminium flake pigment of 35 $\mu$m median flake diameter was treated and dried as in Example 1.

4 g of the dried powder was mixed with
7.5 g isopropanol and
15 g of Glascol LS2, a water based acrylic resin manufactured by Allied Colloids Limited.

The result printing ink provided a bright metallic drawdown, using a No.2 wirewound bar.

EXAMPLE 3

A solvent based ink was prepared form the same dried metallic powder of Example 2 by mixing together
4 g of the dried powder
7.5 g toluene and
15 g 10180VSH printer's ink. (Coates Lorilleux Limited)

A drawdown prepared in the same way displayed a similar visual effect.

EXAMPLE 4

An aluminium flake pigment of 230 $\mu$m median flake diameter was coated with 1.15% silica, based on the weight of metal.

340 g of coated flake, in the form of a paste in
130 g water was loaded into a Hygienic 91 porous bag of surface area 0.205 m$^2$ and 50 $\mu$m pore size. (Qualtex Limited)

The bag was sealed and placed in an air circulating oven at 65° C. for 9.5 hrs until constant weight was achieved, indicating that all the liquid had been removed.

The bag was transported in a dust free manner to a blender containing 34 kg of coloured low density polyethylene polymer pellets damped by 0.5% mineral oil. The pigment content of the bag was discharged directly into the blender, without significant dust generation, then briefly mixed with the polymer pellets. On injection moulding, an excellent dispersion of large, sparkling silver flakes in coloured polymer was obtained.

EXAMPLE 5

An aluminium flake pigment of 13 $\mu$m average flake diameter was coated by silica in isopropanol. A paste comprising approximately 55% metal and 45% isopropanol was loaded into the porous bag of Example 1. The bag was sealed and the isopropanol rapidly removed in a vacuum oven at 60° C.

15 g of the thus dried pigment was carefully discharged directly into a UV curing flexographic ink system comprising
37 g Ebecryl 80 polyester acrylate prepolymer (UCB Limited)
41 g Ebecryl 81 polyester acrylate prepolymer (UCB Limited)
3 g Darocure 4265 photoinitiator (Ciba plc)
3 g Darocure 1173 photoinitiator (Ciba plc) and
1 g PA57 flow modifier (Dow Chemical).

The ink was diluted as necessary with monomer and diluting oligomer, then printed onto a paper substrate. A uniform, opaque, bright coating was achieved.

EXAMPLE 6

To 283 g of a 12 $\mu$m average particle diameter aluminium paste of 65% solids content in white spirit in a mixer was added,
14 g of a ketone resin, (Laropal K80; BASF) and
2 g mineral oil, (Kaydol; Witco) both pre-dissolved at 70° C. in 16 g xylene and cooled to 20° C.

After thorough low shear mixing, the paste was transferred into a porous autoclave bag of 18 cm×37 cm. (Rexam Medical Packaging Ltd). The bag was sealed and placed in an air circulating oven at 70° C. for 10 hours. The resulting dry metal pigment product was a loose, low dusting solid, easily dispersible in solvent based ink media to give a bright metallic silver.

What is claimed is:

1. A process for packaging metal pigment, said process comprising:
   a) providing metal pigment dampened by a liquid;
   b) placing the dampened metal pigment in a porous container and sealing the container; and
   c) substantially drying said pigment within said sealed container wherein the porosity of said container is chosen to permit removal of the liquid whilst retaining substantially all of said pigment within said container.

2. The process as claimed in claim 1 wherein all of said pigment is retained within the container.

3. The process as claimed in claim 1 wherein said container includes a flexible bag portion made from a material selected from the group consisting of paper, calendared woven fibre material, coated woven fibre material, uncoated woven fibre material and polymer material.

4. The process as claimed in claim 1 wherein said container has an anti-static discharge coating.

5. The process as claimed in claim 1 wherein said pigment is selected from the group consisting of flake pigments, ESS pigments and glitter flake pigments.

6. The process as claimed in claim 5 wherein said pigment is a flake pigment having a median particle size of 5 to 20 $\mu$m.

7. The process as claimed in claim 6 wherein the metal pigment is in the form of a paste, wherein said liquid comprises water and wherein removal of the liquid includes an evaporation step.

8. The process as claimed in claim 7 wherein the container is substantially formed from paper.

9. The process as claimed in claim 1 wherein the dampened pigment is in the form of a paste.

10. The process as claimed in claim 1 wherein the liquid is water or an organic solvent for the metal pigment.

11. The process as claimed in claim 1 wherein the liquid includes an additive to reduce the dusting of the metal pigment.

12. The process as claimed in claim 1 wherein the liquid includes an additive to aid redispersion of the metal pigment.

13. The process as claimed in claim 1 wherein at least some of said liquid is removed by centrifugation.

14. The process as claimed in claim 1 wherein removal of said liquid from the container occurs by evaporation of the liquid.

15. The process as claimed in claim 14 wherein the pressure around said container is lowered to accelerate evaporation of said liquid.

16. The process as claimed in claim 14 wherein said container includes a flexible paper bag portion and wherein in said drying step the container plus dampened metal pigment is heated to a temperature of 50 to 100° C. at ambient pressure to accelerate evaporation of said liquid.

17. The process as claimed in claim 14 wherein the sealed container is heated to accelerate evaporation of said liquid.

18. The process as claimed in claim 17 wherein the pressure around said container is lowered to accelerate evaporation of said liquid.

19. A process of transporting substantially dry metal pigment, said process including the steps of:

a) packaging and substantially drying the metal pigment in accordance with claim 1; and b) transporting said packaged pigment within said container.

* * * * *